US009141518B2

(12) United States Patent
Bharadwaj et al.

(10) Patent No.: US 9,141,518 B2
(45) Date of Patent: Sep. 22, 2015

(54) GUI TESTING

(75) Inventors: Anutthara R Bharadwaj, Hyderabad (IN); Balachander Ganapathy Subramaniam, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1190 days.

(21) Appl. No.: 12/331,699

(22) Filed: Dec. 10, 2008

(65) Prior Publication Data

US 2010/0146420 A1    Jun. 10, 2010

(51) Int. Cl.
*G06F 3/048* (2013.01)
*G06F 11/36* (2006.01)
*G06F 3/0481* (2013.01)

(52) U.S. Cl.
CPC .......... *G06F 11/3676* (2013.01); *G06F 3/0481* (2013.01); *G06F 11/3696* (2013.01)

(58) Field of Classification Search
USPC ................................. 715/124–35
See application file for complete search history.

(56) References Cited

U.S. PATENT DOCUMENTS

| | | | |
|---|---|---|---|
| 5,542,043 A * | 7/1996 | Cohen et al. | 714/32 |
| 6,505,342 B1 | 1/2003 | Hartmann et al. | |
| 7,020,841 B2 * | 3/2006 | Dantzig et al. | 715/727 |
| 7,093,238 B2 * | 8/2006 | Givoni et al. | 717/129 |
| 7,290,245 B2 * | 10/2007 | Skjolsvold | 717/125 |
| 7,296,197 B2 | 11/2007 | Pushpavanam et al. | |
| 7,685,252 B1 * | 3/2010 | Maes et al. | 709/217 |
| 2003/0005413 A1 | 1/2003 | Beer et al. | |
| 2004/0059809 A1 * | 3/2004 | Benedikt et al. | 709/224 |
| 2006/0010426 A1 | 1/2006 | Lewis et al. | |
| 2006/0179383 A1 | 8/2006 | Blass et al. | |
| 2008/0082968 A1 | 4/2008 | Chang et al. | |
| 2008/0126902 A1 | 5/2008 | Hickman et al. | |
| 2008/0155515 A1 | 6/2008 | Stewart | |
| 2008/0250051 A1 * | 10/2008 | Grechanik et al. | 707/102 |
| 2009/0319832 A1 * | 12/2009 | Zhang et al. | 714/38 |

OTHER PUBLICATIONS

Isaacs, Scott, Inside Technique: Form Validation Techniques, Oct. 6, 2000, siteexperts.com, http://web.archive.org/web/20001006223730/http://www.insidedhtml.com/tips/html/ts18/page1.asp.*
Alsmadi, et al., "An Object Oriented Framework for User Interface Test Automation", Retrieved at <<http://www.micsymposium.org/mics_2007/papers/Alsmadi.pdf>>, pp. 11.
Linz, et al., "How to Automate Testing of Graphical User Interfaces", Retrieved at <<http://www.imbus.de/engl/forschung/pie24306/gui/aquis-full_paper-1.3.shtml>>, Oct. 16, 2008, pp. 7.

(Continued)

*Primary Examiner* — Matt Kim
*Assistant Examiner* — William Trapanese
(74) *Attorney, Agent, or Firm* — Aneesh Mehta; Aaron Hoff; Micky Minhas

(57) ABSTRACT

Controls of a graphical user interface (GUI) in an application under test (AUT) can be tested where the AUT utilizes an accessibility support framework. An accessibility application programming interface (API) can be used to expose controls in the GUI along with their properties. Using an identified control's properties, a set of valid events can be determined for a desired control. Based on the events, parameters for input data for a desired control can be defined, for example, to include data types and data type limitations. Equivalence partitions can be determined for the input data based on the defined parameters, and events can be passed to the accessibility API, along with corresponding input data from the equivalence partitions, to be performed in the desired control of the AUT.

20 Claims, 8 Drawing Sheets

(56) References Cited

OTHER PUBLICATIONS

"Case Studies: UI Testing", Retrieved at <<http://bughuntress.com/portfolio/case-studies/user-interface.html>>, Oct. 16, 2008, pp. 2.

Cem Kaner, "What is a Good Test Case?", Retrieved at <<http://www.kaner.com/pdfs/GoodTest.pdf>>, May 2003, pp. 16.

Memon, et al., "Hierarchical GUI Test Case Generation using Automated Planning", Retrieved at <<http://citeseerx.ist.psu.edu/viewdoc/summary?doi=10.1.1.34.3499>>, pp. 1-13.

* cited by examiner

| CONTROLTYPE | TOTALCONTROLS | COVEREDCONTROLS | COVERED% |
|---|---|---|---|
| GROUP | 1 | 0 | 0% |
| BUTTON | 5 | 2 | 40% |
| TEXT | 7 | 0 | 0% |
| EDIT | 5 | 2 | 40% |
| CHECKBOX | 6 | 6 | 100% |
| WINDOW | 26 | 0 | 0% |
| DATETIMEPICKER | 1 | 0 | 0% |

GUI TESTING

BACKGROUND

In a computing environment, applications that use graphical user interfaces (GUIs) to allow computer users to interact with the application can comprise many and varied user interactive controls. Often when applications that comprise GUIs are being developed, testers will test the GUI's controls to determine whether they operate within prescribed parameters (e.g., don't throw errors in the application). Because GUI controls can often react differently to different events (e.g., click, mouse hover, enter data, select item), and may allow for different types of data, having different properties, testing all a GUI's controls can be cumbersome.

Most current applications utilize an accessibility framework that provides programmatic access to user interface (UI) elements, enabling an application (e.g., a plug-in application) to expose property values of UI elements and execute them programmatically (e.g., activating the element without having to use the GUI). Plug-in applications that facilitate computer use for disabled persons can utilize a base application's accessibility framework, for example, to read text on a screen. Further, out-of-procedure applications may be able to access UI properties of an application with an accessibility framework. Additionally, automated GUI testing can use an application's accessibility framework to test GUI elements.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Testing graphical user interfaces (GUIs) can be difficult, as current testing approaches typically utilize ad-hoc manual testing. Manual testing can be cumbersome and time consuming for a tester. Further, there may be no real metrics to measure how complete the testing is for a GUI when manually testing. For example, a typical form filling application may have several text boxes for users to enter data (e.g., text strings or numerical information); a tester may have to manually enter various iterations of valid and invalid data to test the control's functions, and the GUI may comprise many of these controls.

Additionally, manual testing usually involves "scenario testing" where tests are run on the GUI that cover a limited set of scenarios that have been envisioned by the testers or developers. However, this type of testing does not allow testers to find all potential issues, or even cover all of the controls in the GUI.

Code coverage or block coverage metrics do not typically allow for easy interpretation of how thoroughly a GUI controls have been tested, for example, with tests that may cover all portions of the GUI's controls. Consequently, testers usually end up finding issues or bugs merely from ad hoc testing planned from initial and commonly changing specifications, leaving a multitude of unfound issues in the GUI.

As provided herein, user interactive controls in a graphical user interface (GUI) of an application under test (AUT) that provides an accessibility framework can be tested. In one embodiment, control testing can be mostly automated, and even retesting of GUI controls that may have changed can be mostly automated. In another embodiment, control coverage metrics can allow a tester to determine when they are done testing, for example.

In one embodiment, properties of GUI controls in an AUT can be determined by using an accessibility application programming interface (API) to crawl the AUT to expose the AUT's control properties using the AUT's accessibility support framework. An AUT's accessibility framework can be used to expose and retrieve GUI control properties to be used to identify potential events. In this embodiment, a set of valid events for an identified control can be identified based on the control's properties, for example, returned by the accessibility API. Input data parameters, if needed for the set of events for a control, can be defined. For example, a tester can determine a data type and limitations for the data type. Input data equivalence partitions can be determined for the set of events for a control based on the defined parameters. For example, partitions may comprise valid input, invalid input and boundary values.

The accessibility API can be used to test a desired control, for example, by performing one or more desired events in the desired control using desired input data chosen from the equivalence partitions. In another embodiment, control coverage metrics can be generated, for example, that identify respective control types, a corresponding number of controls per control type, an amount of controls tested per control type, and control coverage represented as a percentage per control type.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
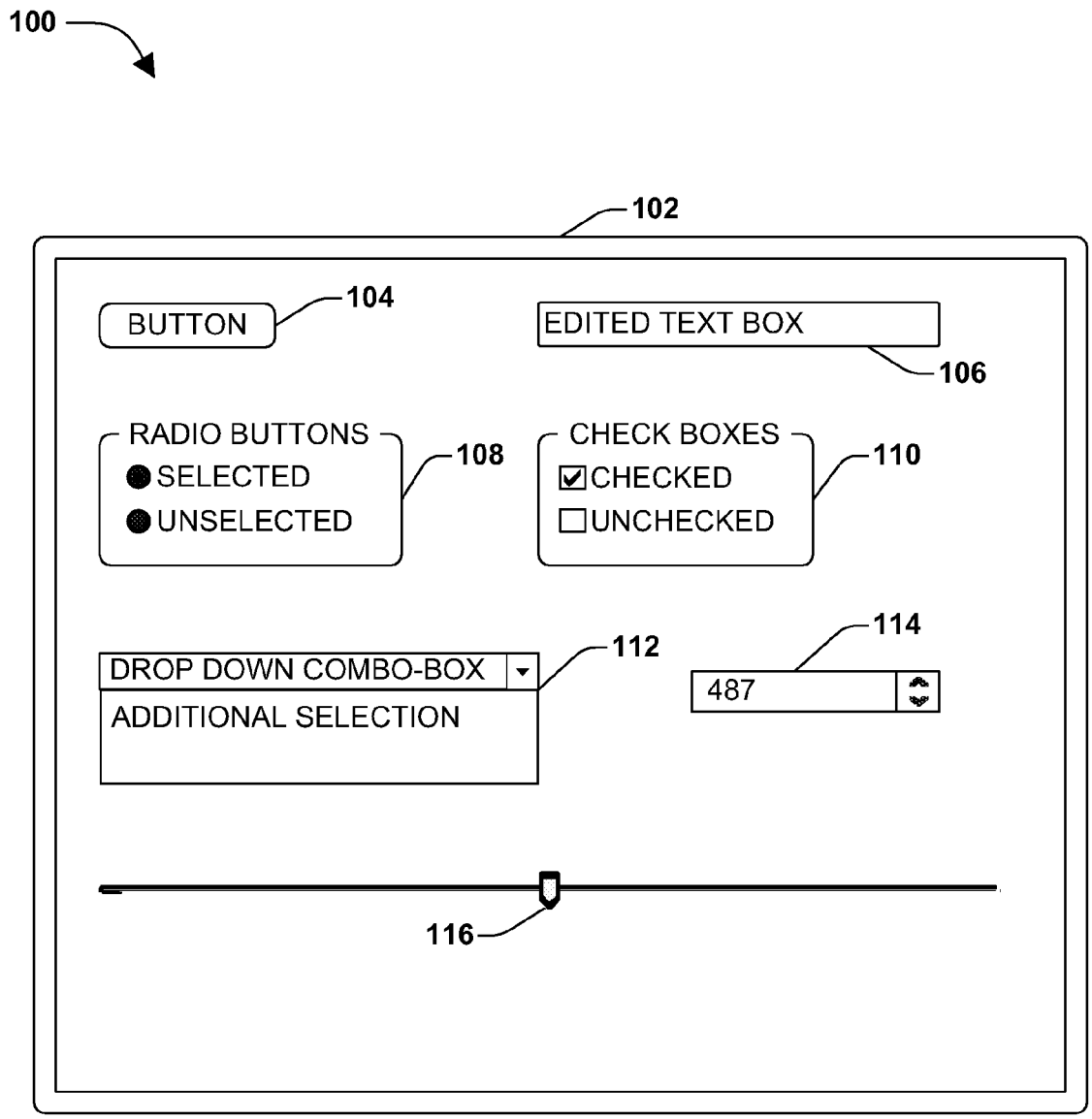
FIG. 1 is an illustration of an exemplary graphical user interface (GUI) comprising GUI widgets.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A graphical user interface (GUI) in an application under test (AUT) can comprise many GUI "widgets," as controls that may be exposed using an accessibility framework provided with the application. FIG. 1 is an illustration of an exemplary GUI 100 comprising "widgets" with which a user may interact, and which a tester may need to test to determine if the application reacts appropriately. The exemplary GUI 100 is displayed on a computer screen 102, and a user can move a mouse curser around the screen to select a "widger" with which to interact.

A common example of a GUI widget is a command button 104, which a user can click on to perform some function. The user can also enter data (e.g., strings, number, etc.) into an edited text box 106. Radio buttons 108 and check boxes 110 can be selected or unselected by a user, for example, to indicate a particular selected item. A number edit box 114 may be used to enter numbers, and to increase or decrease a number value by clicking on one of the attached "spin buttons" (arrows). A drop-down combo box 112 may include a list of items, from which the user can select, by clicking on an attached down-arrow. A scrollbar 116 can be used to scroll through portions of a page or video. Further, many more GUI widgets, and combinations of such, are available to program developers for use in GUIs (e.g., list boxes, drop-down menus, toolbars, ribbons, tree-views, tabs, tooltips, infobars, utility windows).

Figure 2:
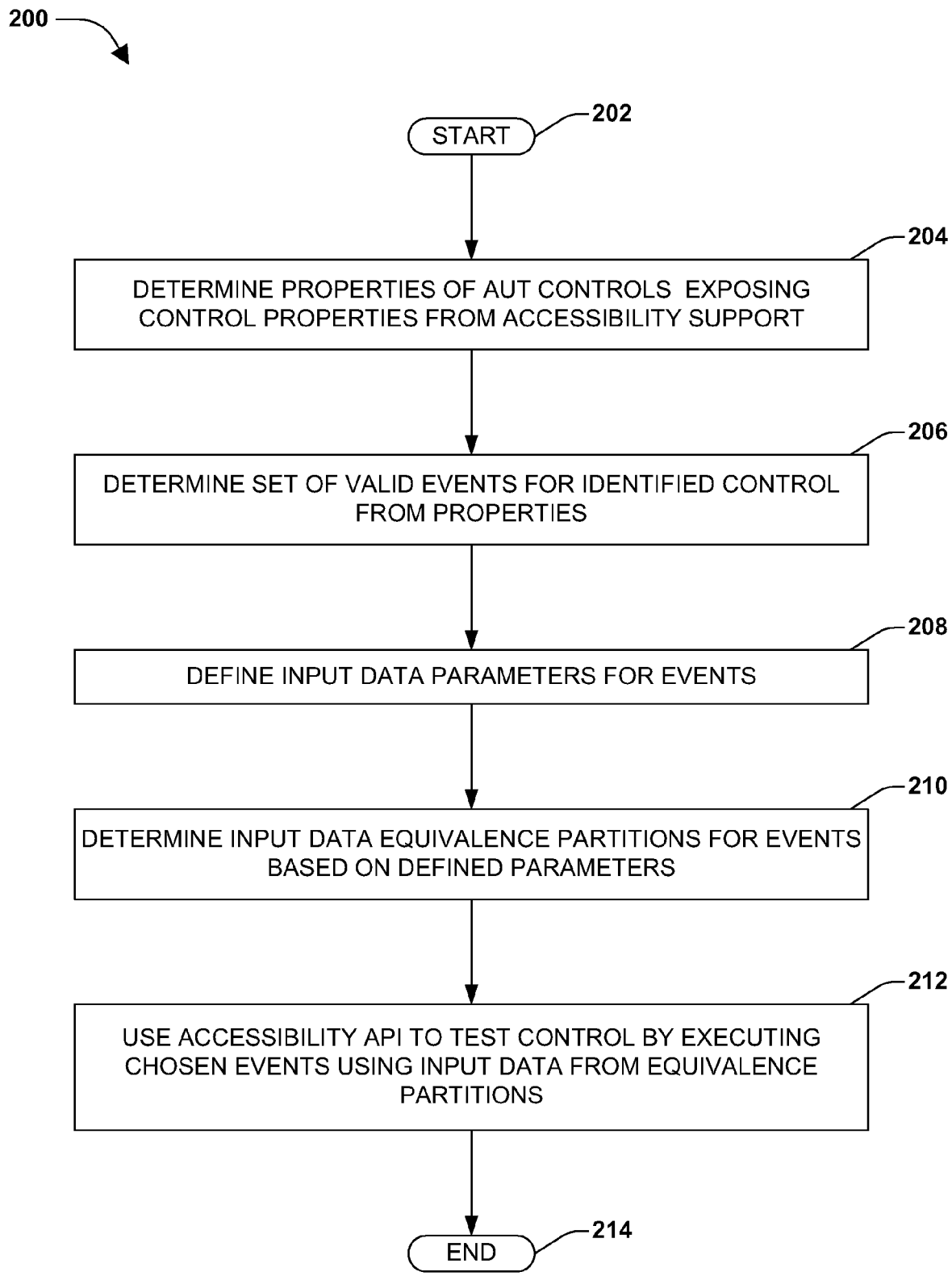
FIG. 2 is a flow chart illustrating an exemplary method for testing user interactive controls in a graphical user interface of an application under test that provides an accessibility framework.

Manual testing of an AUT's GUI controls can be cumbersome, considering the array of possible GUI "widgets" that may be used and possible interactions or data input for respective "widgets." However, an application accessibility framework may be utilized to automate some of the testing tasks. FIG. 2 is a flow chart diagram of an exemplary method 200 for testing user interactive controls in a graphical user interface (GUI) of an application under test (AUT) that provides an accessibility framework.

The exemplary method 200 begins at 202 and involves determining properties of GUI controls in an AUT by using an accessibility application programming interface (API) to crawl the AUT to expose user interactive GUI control properties using the AUT's accessibility framework, at 204. For example, an application accessibility support framework can provide common properties of a user interface (UI) element, such as Name, State, Value, Description, and/or Class Name, for example, associated with the UI element (e.g., where events associated with a control may be defined in a look-up mechanism). In one embodiment these properties can be exposed by using an API that crawls the AUT to identify GUI controls and their properties. In this way, for example, because controls are typically labeled under the accessibility support framework, the accessibility API can identify and return a list of controls that the AUT uses in its GUI.

Further, in this embodiment, under an application's accessibility support framework properties of an exposed control should also be labeled. For example, a control's class, which may define its general characteristics and behaviors, and an object of the control in that class, which may define general characteristics and behaviors the control exhibits in the GUI, may be identified. In this way, for example, because a control's properties are typically labeled under the accessibility support framework, the accessibility API can identify and return a list of properties for respective controls in the AUT.

At 206, a set of valid events for an identified control from the AUT is identified, based on identified properties of the control. For example, in order to test respective actions that a user may perform on a GUI "widget" (e.g., a user interactive control in a GUI), valid events for a control used in the GUI should be determined. In one embodiment, valid events for a control may be identified by matching the control's class object with events that can be performed for the class object. In this embodiment, a hash map can be generated that maps user interactable controls to valid events that can be performed on the controls. In this example, the map can be used to determine merely those events that can be performed on identified controls in the AUT. In another aspect, valid events may be determined merely based upon control type rather than other properties.

At 208, input data parameters for the set of events for a control are defined. In one embodiment, an AUT tester may wish to bind a particular event for the control to a particular data type, and may further wish to specify limitations for the data type. For example, the AUT may be a form application that calls for particular user inputs in various locations. In this example, a user may be asked to input their name, age, date of birth, and other related information. A tester can define that a data type of merely integers be input to the age control, and further define a range of integers for the data type. In this way, in this example, the tester can bind an event that allows data input for the user's age to integers within a specified range.

In FIG. 2, at 210 of the exemplary method 200, input data equivalence partitions for the set of events for a control can be determined based on the defined parameters. In one embodiment, input data can be partitioned into valid and invalid data, based on defined parameters. For example, a tester of a form application may define parameters for entering a person's age into an age control as positive integers less than one hundred and thirty one. In this example, equivalence partitioning can identify a valid partition to include those positive integers less than one hundred and thirty one, while an invalid partition can include all other potential inputs, such as negative integers, integers greater than one hundred and thirty, non-integer numbers, and letters or symbols.

In another embodiment, input data can be partitioned into valid data, invalid data, and boundary data, based on defined parameters. Boundaries between valid and invalid values can often be a source of error for application controls. For example, a control that receives a number from one to twelve, representing months of a year, may be determined to have boundary values at zero and one at a lower boundary, and twelve and thirteen at an upper boundary. In another example, a boundary may comprise a value between a valid and invalid entry. In this example, the lower and upper boundaries may comprise three values respectively: boundary value, boundary value minus 1, and boundary value plus 1.

At 212, an accessibility API is used in conjunction with the AUT's accessibility support framework to test a desired control by performing one or more desired events in the desired control using desired input data from the equivalence partitions. For example, an application's accessibility support framework can allow for programmatic execution of GUI controls (e.g., executing an AUT's GUI widget without interacting with the GUI). In this example, an API that is configured to work with the application's accessibility support framework can be used to programmatically execute GUI controls.

In one embodiment, a control handle that comprises an event chosen by a tester along with corresponding input data from equivalence partitions chosen by the tester can be passed to an accessibility API. Using the AUT's accessibility support framework, the accessibility API can perform the desired event in the desired control using the desired input data. For example, a tester may wish to test an age control in a form application. In this example, an "input data" event handle for the age control can be passed to the accessibility control, along with representative data from valid and invalid equivalence partitions. The event can be performed in the control for the respective input data, for example, to determine how the GUI responds.

Having tested the control in the AUT, the exemplary method 200 ends at 214.

Figure 3:
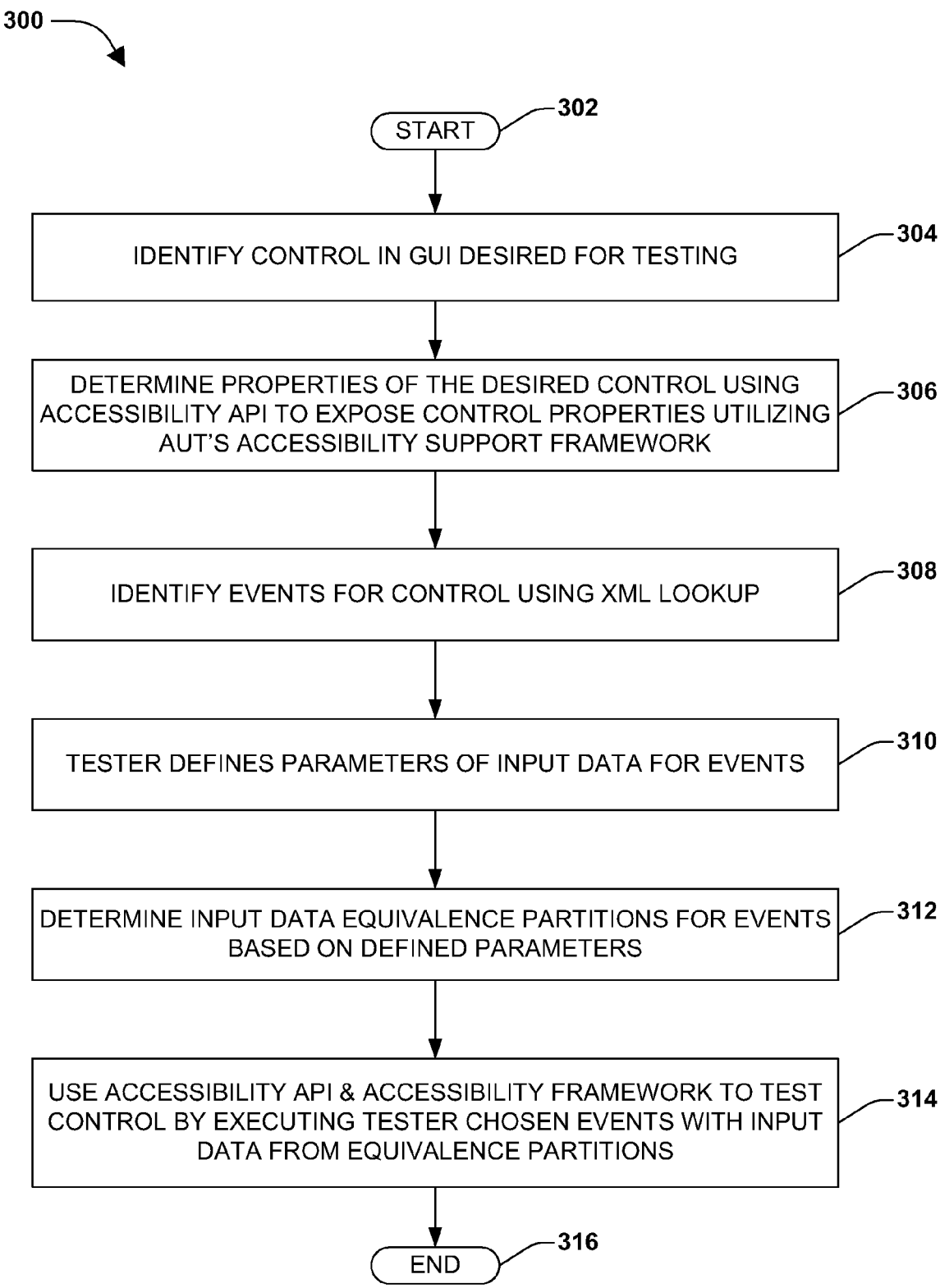
FIG. 3 is a flow chart illustrating one embodiment of an implementation of methods described herein.

FIG. 3 is a flow chart diagram illustrating one embodiment 300 of testing a user interactive control in a graphical user interface (GUI) of an application under test (AUT). The exemplary embodiment 300 begins at 302 and involves identifying a desired control in a GUI of an AUT, at 304. In this embodiment, for example, a tester of the AUT may wish to merely test a particular GUI widget. At 306, properties of the desired control are determined by using an accessibility API to expose the desired control's properties utilizing the AUT's accessibility support framework. As described above, a control's properties can include an object class that can define types of event handlers and functions for that control. Using the AUT's accessibility support framework, the control's object class can be exposed by the accessibility API.

In this exemplary embodiment 300, at 308, a set of valid events, which may be performed in the desired control, can be determined by looking up an extensible markup language (XML) file associated with the AUT. For example, a control in a computer program that represents that AUT may comprise function calls to an XML file associated with the AUT. In this example, when the control is executed programmatically, the program's code may call to the XML file for the function to be performed. Further, because the AUT's accessibility support framework allows for these function calls (e.g., from event handlers) to be exposed, valid events for the desired control can be identified by looking them up in the associated XML file.

At 310, a tester of the AUT defines input data parameters for the valid events, for the desired control. For example, as described above, a tester of the AUT can determine a data type (e.g., strings variable, integer, etc.) for the input data used in the events, and determine limitations (e.g., a certain set of numbers, English characters forming a string of a certain length) for the data type. At 312, equivalence partitions are determined for the input data, based on the tester's parameters. For example, as described above, a set of data for valid, invalid, and boundary values can be determined for the input data. In one embodiment, a tester may choose representative input data from respective equivalence partitions to be input to the event, or may choose data from one equivalence partition to be input.

At 314, the accessibility API is used with the AUT's accessibility support framework to test the desired control by performing one or more tester chosen events in the control, using tester chosen input data from the equivalence partitions. In this embodiment, for example, a tester may choose to execute all of the valid events identified for the desired control, or they may choose one or more of the valid events. Further, in this example, the tester may choose different combinations of equivalence class input data for different chosen events. At 316, the example method 300 ends.

In one aspect, GUI control coverage metrics can be created for an AUT, which identify GUI controls that have been covered by accessibility API testing of the controls. In one embodiment, an accessibility API can be used to expose GUI controls in the AUT, and the accessibility API can retrieve a control type for respective controls. In this embodiment, for example, when events are passed to the accessibility API to be programmatically executed in the GUI controls, information regarding testing of respective controls can be logged.

Figures 7, 8:
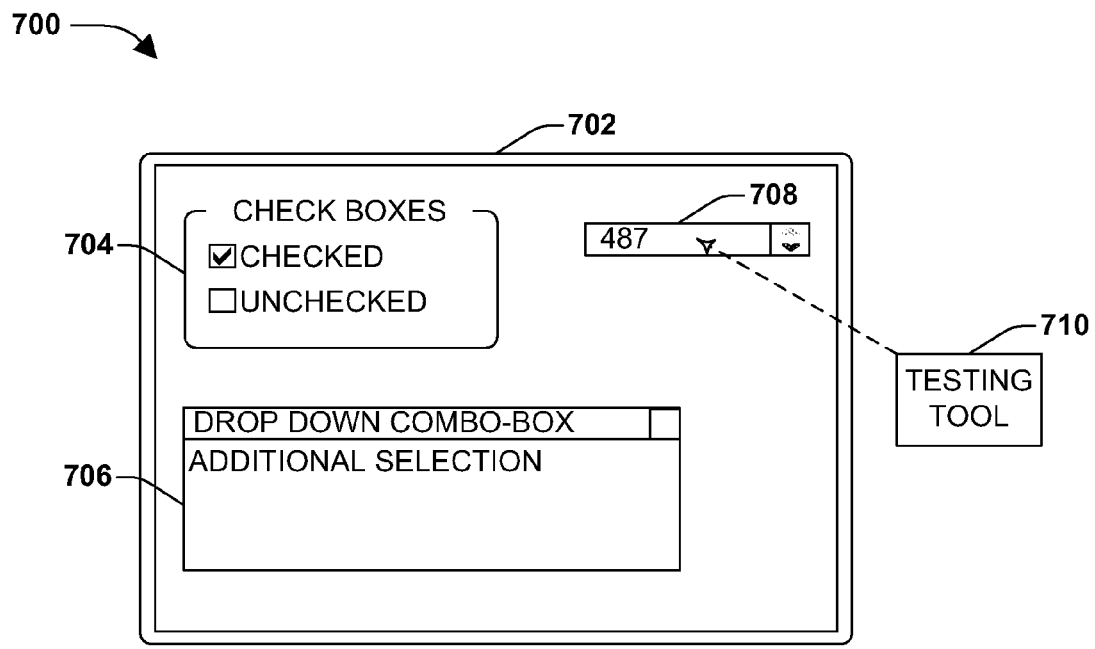
FIG. 7 is an illustration of another exemplary environment where a system for testing user interactive controls, as described herein, may be implemented.
FIG. 8 is an illustration of exemplary control coverage report for an application under test.

Further, once controls for the AUT have been identified, along with their respective control type, and a log of testing information is compiled for controls that have been tested, control coverage testing results can be assembled, for example, for the tester to review. FIG. 8 is an illustration of an exemplary control coverage report 800 for an AUT.

In the exemplary report 800, a first column 802 comprises a GUI control type; a second column 804 comprises a total number of controls that are of the corresponding control type 802; a third column 806 comprises a number out of the total controls 804 of a corresponding control type 802 that have been covered by the testing; and a fourth column 808 comprises a percentage of the total controls 804 covered by the testing.

In the exemplary report 800, a "BUTTON" control type 802 has a total of five controls 804 in the AUT's GUI. Of the five controls 804, two have been covered 806 by the testing. The two tested "BUTTON" controls in the GUI represent forty percent 808 coverage for this control type. It will be appreciated that the exemplary report 800 is merely one embodiment utilizing the techniques and systems described herein. It is anticipated that those skilled in the art may devise alternate embodiments for reporting control coverage of the GUI testing.

In another aspect, when an accessibility API is used to perform testing of desired controls, using desired events, the testing can be recorded. For example, if a GUI has been changed during AUT development, but after a tester has performed control testing, a tester may wish to re-execute the previous testing performed prior to the changes. In this aspect, the testing can be recorded, for example, so that a same testing can be applied to the GUI after it has been changed.

However, for example, changes implemented in the GUI may cause an automated playback of the testing to break due to changes in the control that was tested in the AUT. For example, where a first version of a GUI comprised a user edited text-box to input a month of a year, a second, changed version may comprise a drop-down selection-box for selecting a month from a list. In this example, events that were valid for the first GUI version may not be valid for the second GUI version.

Upon detecting a break in an automated test playback alternate valid events may be suggested to a tester. In one embodiment, a changed control's properties can be exposed by an accessibility API, as described above, and a pre-generated event map can be used to generate alternate valid events for the changed GUI control. As an example, after a break in the playback is detected, a user interface comprising a list of alternate valid events to select from may be displayed to the tester, who can select an alternate event and proceed with the retesting.

Figure 4:
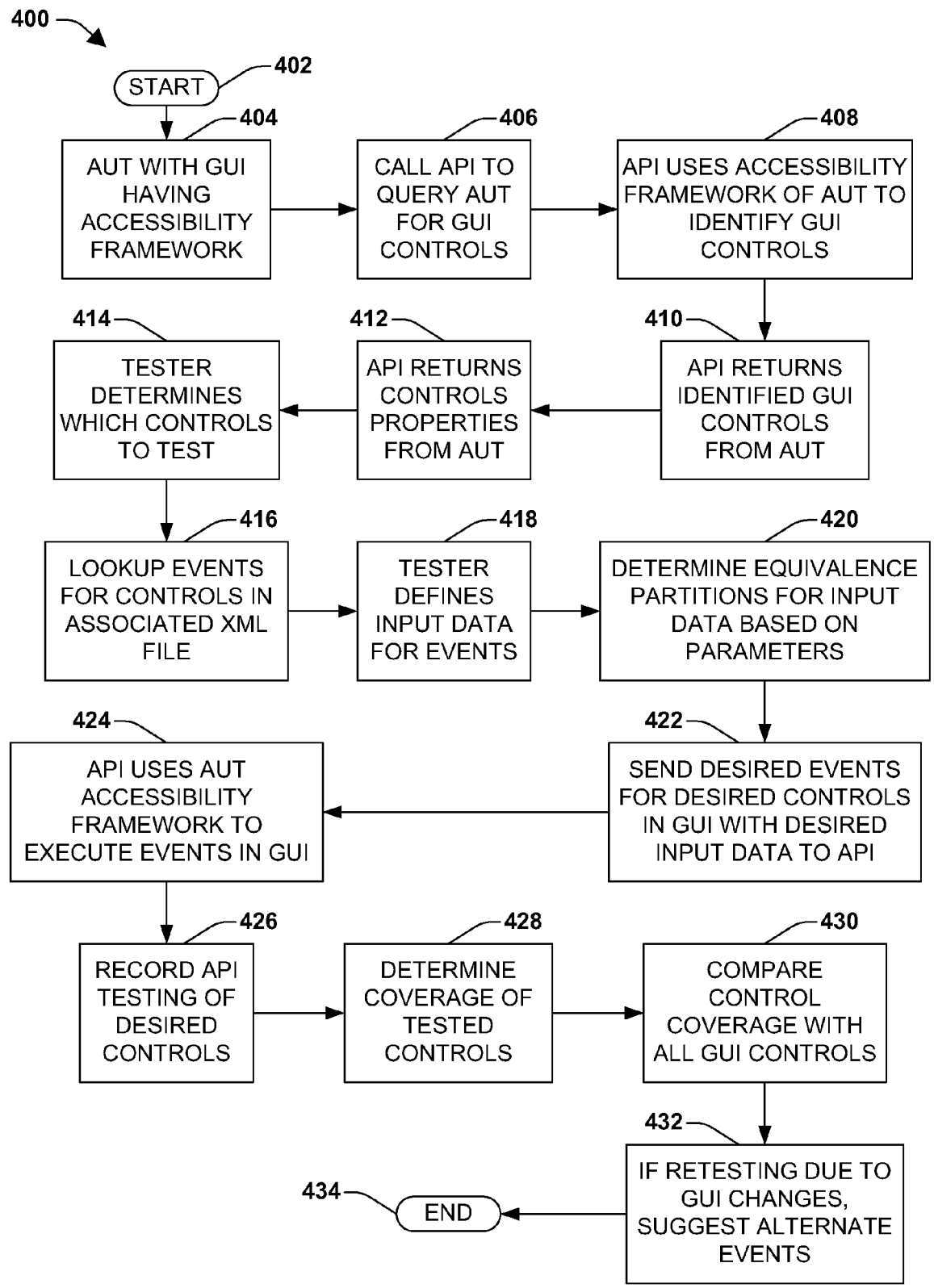
FIG. 4 is a flow chart illustrating one embodiment of an implementation of methods described herein.

FIG. 4 is a flow chart diagram illustrating one embodiment 400 of using the techniques, described herein, for testing user interactive controls in a graphical user interface (GUI) of an application under test (AUT) that provides an accessibility framework, and begins at 402. At 404, an AUT comprises a GUI and has an accessibility support framework. An accessibility API is called, at 406, to query the AUT for GUI controls, for example, in order to identify those controls in the GUI that may be interacted with by users.

At 408, the accessibility API use the AUT's accessibility support framework to identify GUI controls, and the API returns identified GUI controls for the AUT, at 410. In this embodiment 400, the accessibility API may also return properties of the respective indentified controls, at 412, as the accessibility support framework allows the control properties to be exposed.

At 414, a tester of the AUT may decide which of the returned controls to test, for example, a user interface may be used that allows the tester to select one or more controls for coverage testing. A set of valid events for respective controls chosen for testing by the tester can be determined, at 416, by looking up events associated with the selected controls in an extensible markup language (XML) file associated with the AUT. As described above, for example, the XML file can comprise functions (events) for the respective controls, as exposed under the accessibility support framework. In one embodiment, the tester can choose which of the valid events to perform for the respective chosen controls, for example, using a user interface that lists valid events for the controls.

At 418, the tester can define input data for respective selected events, if input data is used in the selected control. As described above, input data can be defined by data type and by limitations within the data type. Equivalence partitions are determined for the defined input data, based on the tester's parameters, at 420. In one embodiment, the tester can select which of the equivalence data to use in the testing, for example, selecting all data in one equivalence partition, or combining representative data from respective partitions.

At 422, one or more desired events, for a desired control, are passed to the accessibility API, along with corresponding input data selected from the equivalence classes. The accessibility API use the AUT's accessibility support framework to programmatically perform the desired events, using the selected input data, in the desired GUI control of the AUT, at 424. For example, the selected events can be executed using the respective selected input data; therefore, if more than one input datum is selected, the event can be executed more than one time in the desired control.

Testing of the respective desired controls by the accessibility API is recorded, at 426, for example, in order to allow automated playback in a case of a changed GUI. At 428, control coverage testing is determined, for example, a log of the controls tested by the accessibility API is kept. The control coverage testing is compared with a number and type of controls for the AUT, at 430. For example, as described above, control coverage metrics can be generated that identify a number of total controls by control type, a number of corresponding controls tested, and a representation of a percentage of controls tested compared to the total.

If a tester decides to perform retesting of desired controls in the GUI, for example, due to changes in the AUT during development, the tester can use an automated playback of the recorded testing. However, at 432, if there is a break in the automation, for example, due to changes to the desired control, alternate events can be suggested for the tester to select from in order to continue with the re-testing.

Figure 5:
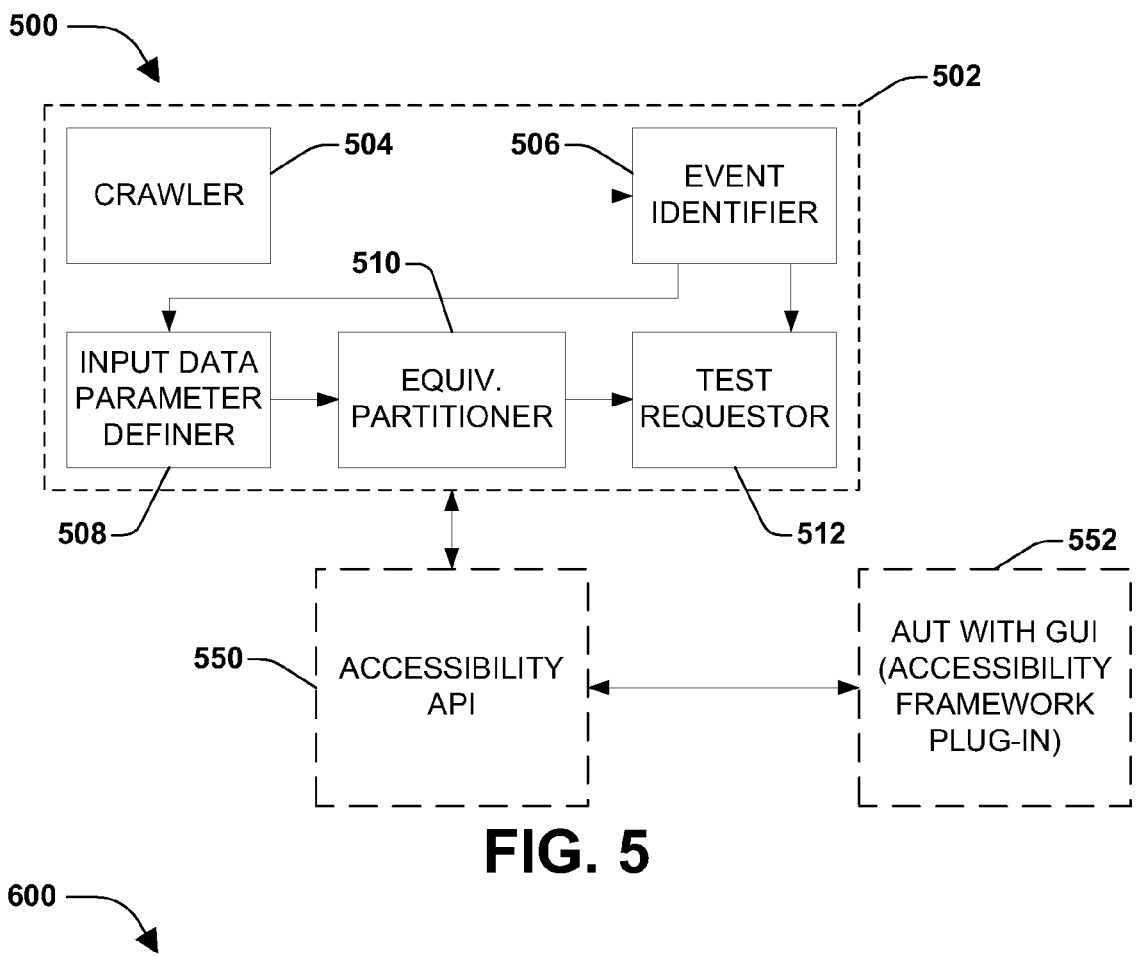
FIG. 5 is a component block diagram illustrating an exemplary system for testing user interactive controls in a graphical user interface of an application under test.

A system may be devised for testing user interactive controls in a graphical user interface (GUI) of an application under test (AUT), where the AUT utilizes an accessibility support framework. FIG. 5 is a component block diagram of an exemplary environment 500 where an exemplary system 502 may be used to test user interactive controls in a GUI.

The exemplary system 502 comprises an AUT crawl component 504, which can be configured to use an accessibility application programming interface (API) 550, in conjunction with the AUT's accessibility support framework, to identify user interactive GUI controls in the AUT 552 and expose and return properties of the identified controls the AUT's. For example, because an application's accessibility support framework allows for controls properties to be exposed, the AUT crawl component 504 can use the accessibility API 550 to retrieve a list of controls used in the GUI, along with their properties (e.g., class object).

The exemplary system 502 further comprises a control events identifier 506, which can be configured to identify a set of valid events for an indentified control from the AUT, based on the identified control's properties. In one embodiment, the control events identifier 506 may use a pre-determined map of events for various controls to identify valid events for the list of controls in the AUT's GUI. In another embodiment, the control events identifier 506 may refer to an AUT's associated extensible markup language (XML) file that identifies functions associated with identified controls.

The exemplary system 502 further comprises an input data parameter defining component 508 configured to define parameters of input data for identified events. In one embodiment, the input data parameter defining component 508 may comprise a user interface that identifies desired controls and corresponding valid events, and allows a tester (e.g., user of the exemplary system) to select (e.g., or input) a data type for respective events, and to limit data within the data type (e.g., select a range of integers). In this way, for example, specific data types and data limitations can be bound to events for desired controls.

The exemplary system 502 further comprises an input data equivalence partition component 510, which can be configured to identify input data equivalence partitions for identified events based on the defined parameters. In one embodiment, the exemplary system may further comprise an input data selection component, comprising a user interface that allows a tester to choose which of the data from the identified equivalence partitions to use for testing an event. For example, if the input data equivalence partition component 510 returns sets of data for valid entries, invalid entries, and border values, a tester may decide to test merely the valid entries, or merely the invalid entries. In another example, the tester may decide to chose particular data from the respective equivalence partitions.

The exemplary system 502 further comprises an accessibility API test request component 512, which can be configured to use the accessibility API 550 to execute a desired control using one or more desired events and desired corresponding input data from the equivalence partitions. In one embodiment, for example, the API test request component 512 can pass an event and corresponding input data, as selected by the tester, to the accessibility API 550, to perform the event in the control of the AUT 552, using the AUT's accessibility support framework.

In one aspect, a system for testing user interactive controls in a GUI of an AUT, where the AUT utilizes an accessibility support framework, may comprise an event suggestion component that can be configured to suggest one or more events for testing for respective controls to a tester. In one embodiment, for example, a tester may wish merely to perform particular events in a desired control. In this aspect, for example, suggested events, from a list of valid events, can be displayed to the tester in a user interface, from which the tester can select desired events to perform.

Further, in this aspect, in one embodiment, the system may comprise an alternate event selection component configured to allow a tester to select an alternate valid event for testing a control than that which was suggested by the event suggestion component. In this embodiment, for example, a tester may wish to select alternate events to be performed in a desired control, for testing. In this example, a user interface may allow for a user to select from one or more alternate events than those suggested for the control.

In another aspect, a tester may wish to identify which of the GUI's controls have been covered by the testing. In this aspect, in one embodiment, a system for testing user interactive controls in a GUI of an AUT, where the AUT utilizes an accessibility support framework, can comprise a coverage metric creation component configured to create control coverage metrics that identify AUT controls covered by the accessibility API testing. For example, coverage metrics may list a number of controls for respective control types, and list how many of the controls per control type have been covered by the testing, along with a percentage tested. In one embodiment, the coverage metrics may be displayed as a report in a user interface for the tester to review.

In another aspect, a tester may wish to re-execute tests on controls in a GUI, for example, where a GUI has been changed during application development. In this aspect, in one embodiment, a system for testing user interactive controls in a GUI of an AUT, where the AUT utilizes an accessibility support framework, can comprise a test recording component configured to record GUI control tests run by the accessibility API. In this way, the tester can record and re-execute covered controls. In another embodiment, in this aspect, where an automated playback of a recorded control execution is broken, for example, due to a change in control events, the system can utilize the alternate event selection component, described above. In this way, for example, an alternate event can be suggested to the tester, who may select a valid event to re-execute the test in the newly changed GUI control.

Figure 6:
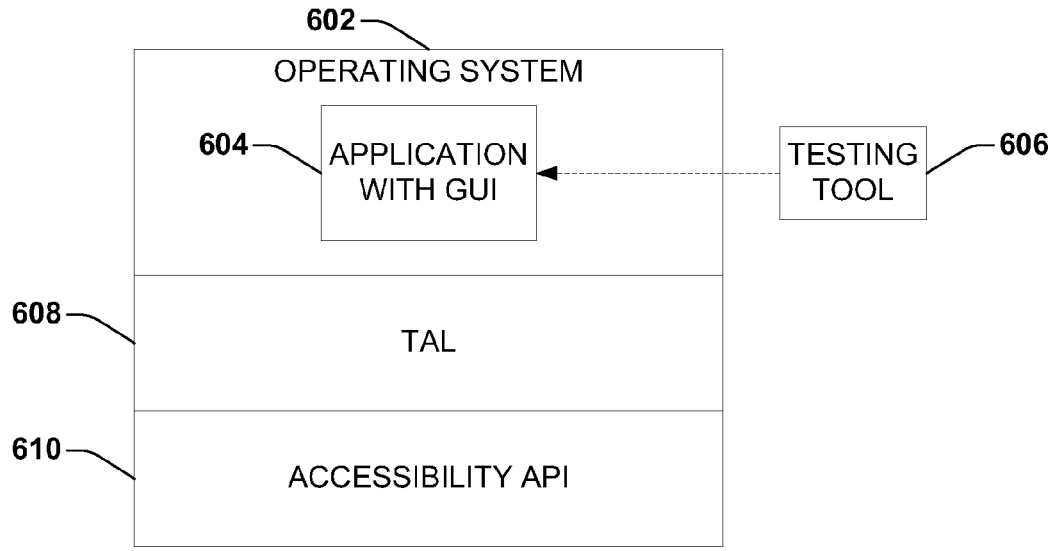
FIG. 6 is an illustration of an exemplary environment where a system for testing user interactive controls, as described herein, may be implemented.

FIG. 6 is an illustration of an exemplary environment 600 where a system for testing user interactive controls in a GUI of an AUT, where the AUT utilizes an accessibility support framework may be implemented. An operating system 602 on a computer system may have an application 604 running that utilizes a graphical user interface (GUI). In this exemplary embodiment, the exemplary system may be comprised in a GUI "testing tool" 606 that can be dropped onto the application's GUI 604 to initiate a testing of the GUI's controls.

In one embodiment, when testing is initiated the testing tool 606 can use an accessibility application programming interface 610 (API) to access a technology adapter layer 608 (TAL), which has a plug-in based logic for respective underlying technologies. For example, if an underlying technology of the application 604 is Microsoft® User Interface Automation (UIA), the TAL 608 has a plug-in registered with the application 604 for accessing its accessibility support framework. In this way, for example, the testing tool 606 can retrieve respective controls and their properties from the GUI 604, regardless of the underlying accessibility support framework technology.

FIG. 7 is an illustration of another exemplary embodiment 700 of an environment where a system for testing user interactive controls in a GUI of an AUT, where the AUT utilizes an accessibility support framework may be implemented. In this exemplary embodiment 700, a graphical user interface (GUI) 702 comprises several GUI widgets: check boxes 704, a drop-down combo box 706, and a number selection box with a spinner 708, which have underlying controls in the GUI's application. In this embodiment, the testing system may be comprised in a testing tool 710, which can be dropped onto a desired GUI widget 708 in the GUI, to test merely the underlying control. Therefore, for example, a tester may test individual controls in a GUI without testing all of the controls in a GUI.

Figure 9:
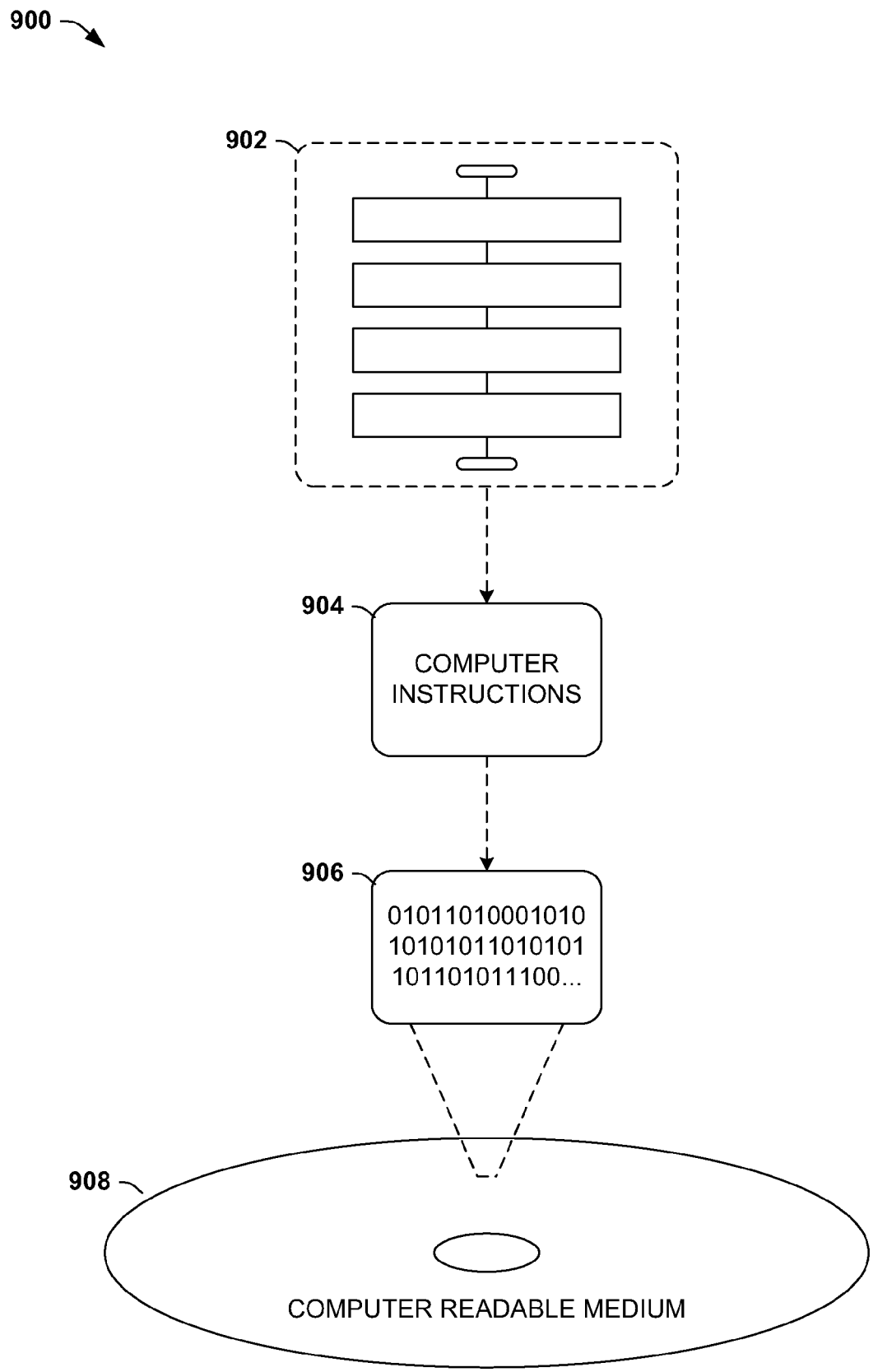
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment, the processor-executable instructions 906 may be configured to perform a method, such as the exemplary method 2 of FIG. 2, for example. In another such embodiment, the processor-executable instructions 906 may be configured to implement a system, such as the exemplary system 5 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
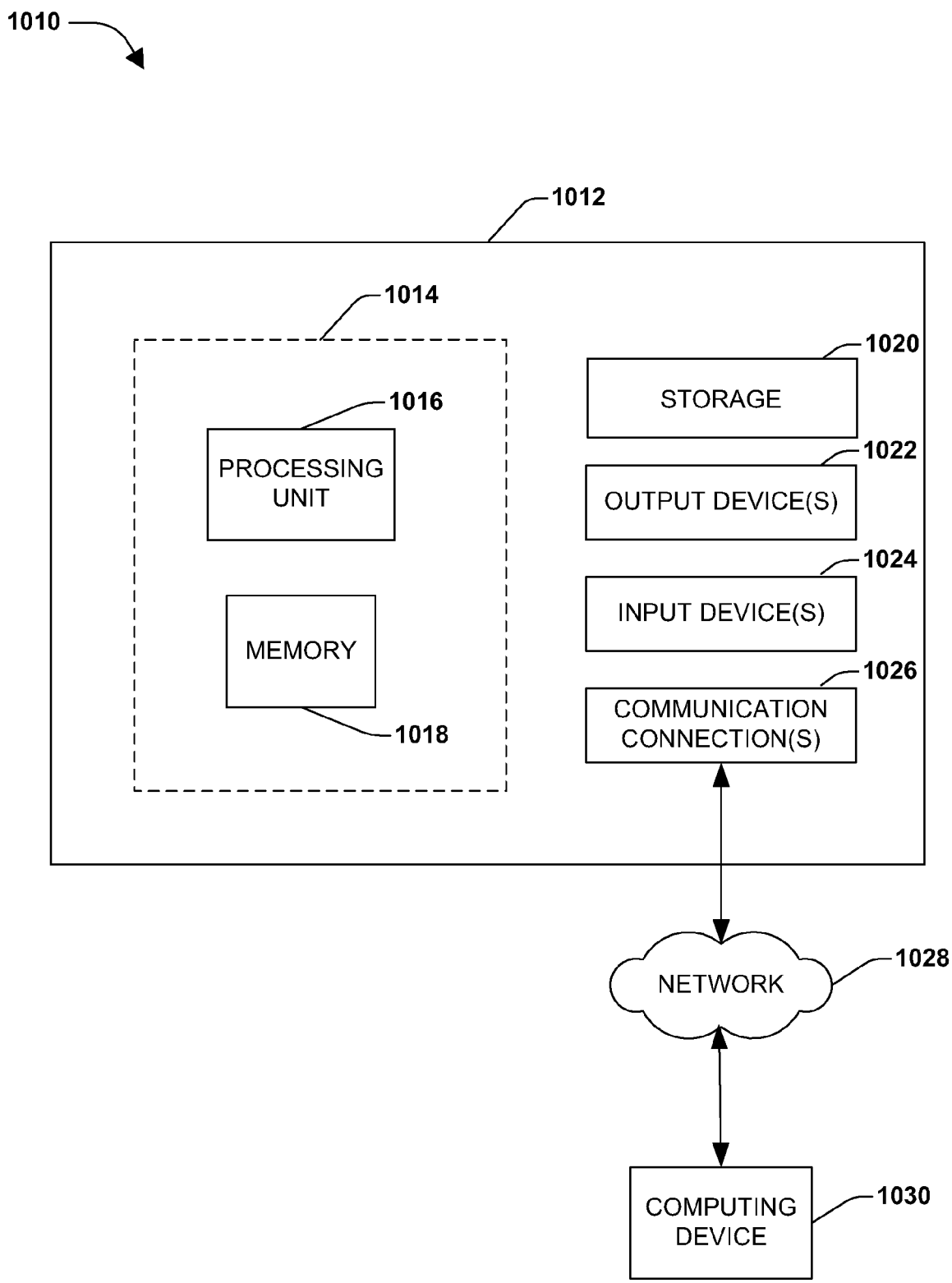
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for testing a user interactive control in a graphical user interface (GUI) of an application under test (AUT) that provides an accessibility framework, comprising:
   discovering at least one of a control type or a control property associated with the user interactive control;
   identifying an event for the user interactive control based at least in part on at least one of the control type or the control property, the identifying comprising:
      receiving input data corresponding to the user interactive control, the input data entered manually by a user; and
      partitioning the input data into a set of valid data, a set of invalid data and a set of boundary data based at least in part on a parameter associated with the user interactive control and defined by a tester of the AUT, the parameter corresponding to a binding, by the tester, of one or more events for the user interactive control to a data type defined as comprising strings, variables or integers, and a specification, by the tester, of a limitation for the data type corresponding to a range;
   suggesting a second event based at least in part on the event and at least on one of the control type or the control property;
   executing at least one of the event or the second event within the AUT to generate at least one of an event executed result or a second event executed result; and
   comparing at least one of the event executed result or the second event executed result with at least one of a known reaction to the event or a second known reaction to the second event, at least some of at least one of discovering, identifying, suggesting, executing, or comparing implemented at least in part via a processing unit.

2. The method of claim 1, comprising creating control coverage metrics indicative of at least one of a total number of controls, a total number of control types, a number of covered controls, or a coverage percentage, at least some of the control coverage metrics based at least in part on the event executed result.

3. The method of claim 1, discovering at least one of the control type or the control property comprising crawling the AUT using an accessibility application programming interface (API) provided by the accessibility framework.

4. The method of claim 1, the control property comprising at least one of an AUT control property or a GUI control property.

5. The method of claim 1, identifying the event comprising identifying a valid event associated with a matching control class object, the AUT configured to generate an output corresponding to the known reaction, upon executing the valid event within the AUT.

6. The method of claim 5, comprising generating a hash map configured to associate the user interactive control with the valid event.

7. The method of claim 5, the valid event based at least in part on at least one of the control type or the control property.

8. The method of claim 1, the event comprising at least one of a click, mouse hover, data entry, or selection.

9. The method of claim 1, the parameter corresponding to age.

10. The method of claim 1, the set of invalid data comprising inputs not comprised in the set of valid data.

11. A system for testing a user interactive control in a graphical user interface (GUI) of an application under test (AUT) that provides an accessibility framework, comprising:
   one or more processing units; and
   memory comprising instructions that when executed by at least one of the one or more processing units implement at least some of:
      a control event identifier component configured to:
         discover at least one of a control type or a control property associated with the user interactive control; and
         identify an event for the user interactive control based at least in part on at least one of the control type or the control property, the identifying comprising:
            receiving input data corresponding to the user interactive control; and
            partitioning the input data into a set of valid data, a set of invalid data and a set of boundary data based at least in part on a parameter associated with the user interactive control and defined by a tester of the AUT, the parameter corresponding to a binding, by the tester, of one or more events for the user interactive control to a data type defined as comprising strings, variables or integers, and a specification, by the tester, of a limitation for the data type; and
      an accessibility application program interface (API) test component configured to:
         suggest a second event based at least in part on the event and at least one of the control type or the control property;
         execute at least one of the event or the second event within the AUT to generate at least one of an event executed result or a second event executed result; and
         compare at least one of the event executed result or the second event executed result with at least one of a known reaction to the event or a second known reaction to the second event.

12. The system of claim 11, comprising a coverage metric creation component configured to create control coverage metrics indicative of at least one of a total number of controls, a total number of control types, a number of covered controls, or a coverage percentage, at least some of the control coverage metrics based at least in part on the event executed result.

13. The system of claim 11, the control event identifier component configured to discover at least one of the control type or the control property based at least in part on a crawl of the AUT.

14. The system of claim 11, comprising a test recording component configured to record a test executed by the accessibility API test component, the test comprising executing the event within the AUT.

15. The system of claim 11, the parameter corresponding to age.

16. The system of claim 11, the set of invalid data comprising inputs not comprised in the set of valid data.

17. A tangible computer-readable storage medium comprising computer-executable instructions, which when executed at least in part via a processing unit on a computer performs acts, comprising:
  identifying an event for a user interactive control, the identifying comprising:
    receiving input data corresponding to the user interactive control; and
    partitioning the input data into a set of valid data, a set of invalid data and a set of boundary data based at least in part on a parameter associated with the user interactive control and defined by a tester of an application under test (AUT), the parameter corresponding to a binding, by the tester, of one or more events for the user interactive control to a data type, and a specification, by the tester, of a limitation for the data type corresponding to a range;
  suggesting a second event based at least in part on the event;
  executing at least one of the event or the second event within the AUT to generate at least one of an event executed result or a second event executed result; and
  comparing at least one of the event executed result or the second event executed result with at least one of a known reaction to the event or a second known reaction to the second event.

18. The computer-readable storage medium of claim 17, the event comprising at least one of a click, mouse hover, data entry, or selection.

19. The computer-readable storage medium of claim 17, the parameter corresponding to age.

20. The computer-readable storage medium of claim 17, the set of invalid data comprising inputs not comprised in the set of valid data.

* * * * *